(12) United States Patent
Bowness

(10) Patent No.: US 8,412,928 B1
(45) Date of Patent: Apr. 2, 2013

(54) ONE-TIME PASSWORD AUTHENTICATION EMPLOYING LOCAL TESTING OF CANDIDATE PASSWORDS FROM ONE-TIME PASSWORD SERVER

(75) Inventor: Piers Bowness, Groton, MA (US)

(73) Assignee: EMC Corporation, Hopkinton, MA (US)

( * ) Notice: Subject to any disclaimer, the term of this patent is extended or adjusted under 35 U.S.C. 154(b) by 452 days.

(21) Appl. No.: 12/750,758

(22) Filed: Mar. 31, 2010

(51) Int. Cl.
*H04L 29/06* (2006.01)
(52) U.S. Cl. .......................................... 713/155
(58) Field of Classification Search .................... 713/155
See application file for complete search history.

(56) References Cited

U.S. PATENT DOCUMENTS

| | | | |
|---|---|---|---|
| 6,434,700 B1* | 8/2002 | Alonso et al. ................ | 713/169 |
| 7,363,494 B2 | 4/2008 | Brainard et al. | |
| 7,757,276 B1* | 7/2010 | Lear ................ | 726/6 |
| 7,904,946 B1* | 3/2011 | Chu et al. .......... | 726/5 |
| 2003/0012382 A1* | 1/2003 | Ferchichi et al. ......... | 380/270 |
| 2003/0105964 A1* | 6/2003 | Brainard et al. ........... | 713/178 |
| 2007/0050635 A1* | 3/2007 | Popp ............... | 713/185 |
| 2007/0220597 A1* | 9/2007 | Ishida ............. | 726/8 |
| 2008/0072303 A1* | 3/2008 | Syed .............. | 726/10 |
| 2008/0313719 A1* | 12/2008 | Kaliski et al. ........... | 726/5 |
| 2009/0328168 A1* | 12/2009 | Lee ................ | 726/6 |

OTHER PUBLICATIONS

Neuman, C., "The Kerberos Network Authentication Service (V5)," Network Working Group, Request for Comments: 4120, MIT, Jul. 2005, from http://datatracker.ietf.org/doc/rfc41201/.
Richards, G., "OTP Pre-authentication draft-ietf-krb-wg-otp-preauth-09," Network Working Group, Internet-Draft, Dec. 5, 2008, from http://tools.ietf.org/id/draft-ietf-krb-wg-otp-preauth-09.

\* cited by examiner

*Primary Examiner* — Jeffrey Pwu
*Assistant Examiner* — William Corum, Jr.
(74) *Attorney, Agent, or Firm* — BainwoodHuang

(57) ABSTRACT

A computing system has a local computing domain coupled to a one-time password (OTP) server. The OTP server maintains user-specific secret data used in a one-time-password (OTP) process to generate OTPs for user authentication. An authentication server in the computing domain sends an OTP request identifying a user to the OTP server. The OTP server executes the OTP process to generate a set of candidate OTPs, any one of which is expected to match a user-generated OTP for a valid authentication. The OTP server returns a response to the authentication server which includes second hashed OTP values, each generated by applying a hash function to a respective candidate OTP. The authentication server performs a comparison function between a first hashed OTP value from the user and the second hashed OTP values. Only upon determining that the first hashed OTP value matches one of the second hashed OTP values, the authentication server performs a protected function in the computing domain that is permitted only upon authentication of the user. Applications include authentication in a ticket-based authentication scheme such as a Kerberos system, in which the protected function may be the granting of a ticket-granting ticket enabling the user to engage service servers in the computing domain.

18 Claims, 5 Drawing Sheets

| TOKEN 26-1 | | | | TOKEN 26-2 | | | | ... |
|---|---|---|---|---|---|---|---|---|
| T0 | T+1 | T-1 | ... | T0 | T+1 | T-1 | ... | |

| INTERVAL T0 | | | | INTERVAL T+1 | | | | ... |
|---|---|---|---|---|---|---|---|---|
| TK1 | TK2 | TK3 | ... | TK1 | TK2 | TK3 | ... | |

ONE-TIME PASSWORD AUTHENTICATION EMPLOYING LOCAL TESTING OF CANDIDATE PASSWORDS FROM ONE-TIME PASSWORD SERVER

BACKGROUND

The invention is related to the field of user authentication using one-time passwords.

Authentication techniques are used as a security measure in computer systems to control access to resources and services, so that access is limited to authorized personnel. There are myriad authentication schemes, many involving the use of a secret password that is known by a user and by a system in which the user needs authentication. In many password-based systems, the passwords are relatively static and often provide only weak protection.

One type of authentication scheme is a so-called ticket-based scheme in which a client computer interacts with an authentication server to obtain "tickets" which vouch for the identity and authorized status of the client among computers participating in the authentication scheme. The client presents the tickets to service servers when requesting access to a service or other resource (for example, to a file system or database hosted by a service server), and the service servers provide requested access to the client on the basis of the tickets so presented (i.e., access is granted if the client presents a ticket which meets all applicable requirements for acceptance by a service server). One widely used ticket-based authentication scheme is known by the name "Kerberos". A general description of the Kerberos scheme can be found in Neuman et al., "The Kerberos Network Authentication Service (V5)", RFC 4120 published July 2005 by The Internet Society.

Ticket-based systems provide an ability for a user to be authenticated to multiple servers without the servers requiring knowledge of a user's password, for example. Instead, the servers (and in fact the clients as well) can rely on a known trusted third party to vouch for the authorized status of potentially many users which may be unknown to the service servers. In Kerberos systems, for example, the primary authentication function is part or all of a "key distribution center" that performs a variety of services pertaining to the proper granting of tickets used for authentication purposes throughout the system. However, even in a complex ticket-based scheme such as Kerberos, the key distribution center or similar central authority interacts with a user partly on the basis of a traditional user password which is known to both the client and the key distribution center.

Also known are systems employing so-called "one-time passwords" or OTPs. In one such system, a hardware device referred to as a "token" applies a known combination function (such as an encryption algorithm) to a secret key value and a dynamic (time-based) value to generate dynamic authentication codes or OTPs. A separate verification computer shares the secret key value and has a time base that is synchronized with that of the token to an acceptable degree, and thus can use the same combination function to generate the same stream of OTPs as the token. In use, a user obtains an OTP from the token as part of being authenticated in some operating environment, such as accessing an on-line service, performing a retail transaction, etc. The OTP from the user is sent to the verification computer along with an identification of the user and/or token. The verification computer uses the user/device identifier to select the secret key value for the device. The verification computer then performs the combination function to generate an OTP, and compares the generated OTP with the OTP received from the user. A match indicates a successful authentication, and in a typical application the verification computer transmits a message back to the operating environment indicating whether the authentication was successful. This indication can be used to enable user access to a resource or the completion of a transaction, for example. A description of one specific arrangement of this type of OTP authentication can be found in Brainard et al., "Method And Apparatus For Performing Enhanced Time-Based Authentication", U.S. Pat. No. 7,363,494 issued Apr. 22, 2008.

SUMMARY

Known authentication techniques such as described above may have certain undesirable limitations. A Kerberos-style system, for example, ultimately relies on a traditional user password which is relatively static, and thus may provide insufficiently strong protection for some applications. And while OTP systems such as that of Brainard et al. provide stronger authentication by virtue of the dynamic and pseudo-random OTPs, they rely on the core authentication to be performed by a verification computer that is generally outside a local computing environment, which may be unduly inflexible and limiting in the deployment of authentication services.

It may be desirable to support the use of one-time passwords (OTPs) in local computing environments that employ password-based authentication schemes (such as Kerberos) in order to obtain the additional strong authentication benefits of OTPs. However, for a variety of reasons it may be undesirable to include the entire functionality of an OTP verification computer in a local computing environment. These reasons might include cost, access to or control over sensitive technology, and the general benefits of specialization.

A system is disclosed in which a local computing domain employs a one-time password service in connection with an authentication function performed in the computing domain, for example by an authentication server such as a Kerberos key distribution center. A specialized server referred to as a one-time password (OTP) server is coupled to the authentication server by a communications channel over which certain OTP-related messages are sent, and OTP-related functions are divided between the OTP server and the local authentication server. The system may be realized by deploying a specialized OTP agent within the authentication server that can perform specialized OTP-related functions in conjunction with the OTP server, requiring minimal change to existing local authentication functions.

The OTP server maintains a set of associations between a set of users and corresponding user-specific secret data used in a one-time-password (OTP) process to generate OTPs for use in authenticating the users. The data, associations and OTP process may be of the general type used in known OTP systems such as the above-mentioned system of Brainard et al.

The authentication server receives an authentication request including a first hashed OTP value from a user in the computing domain. The first hashed OTP value results from application of a hash function to a user-generated OTP which is generated by an OTP process using user-specific secret data known only to the user and the OTP server (e.g., by a token). In response, the authentication server sends an OTP request identifying the user to the OTP server via the communications channel. In some embodiments, the OTP request may also identify which of a plurality of hash functions was used to create the first hashed OTP value.

In response to the OTP request, the OTP server executes the OTP process using the secret data for the identified user to generate a set of candidate OTPs, wherein any one of the candidate OTPs is expected to match the user-generated OTP for a valid authentication of the identified user. In general there are multiple potential criteria for OTP candidacy. One criteria involves time, and more particularly the possibility that a time difference between the OTP server and a device used to generate the user-generated OTP is sufficiently large that a false negative may result, i.e., that the user-generated OTP may not match a particular OTP generated by the OTP server solely due to the time difference. In this case, the candidate OTPs may include OTPs from time intervals adjacent to a current time interval, enabling a match to be made as long as the time difference is within an acceptably small range corresponding to the span of the time intervals. Other criteria for candidate OTPs include the use of multiple devices by the user, in which case candidate OTPs are generated for each device that the user might be using at any particular time.

The OTP server then generates and returns a response to the authentication server via the communications channel which includes second hashed OTP values, each generated by applying the hash function to a respective one of the candidate OTPs. The authentication server performs a comparison function between the first hashed OTP value and one or more of the second hashed OTP values to determine whether the first hashed OTP value matches one of the second hashed OTP values. Only upon determining that the first hashed OTP value matches one of the second hashed OTP values, the authentication server performs a protected function in the computing domain that is permitted only upon authentication of the user. An example of such a protected function is the granting of a TGT in a Kerberos environment.

The system provides for an OTP enhancement to local authentication functions (a) without unduly burdening the local computing environment with the specialized functions of the OTP server, and (b) keeping the more sensitive OTP functions (storing and use of secret data) within the OTP server apart from the local computing environment. These features may be advantageous for a variety of computing system applications.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
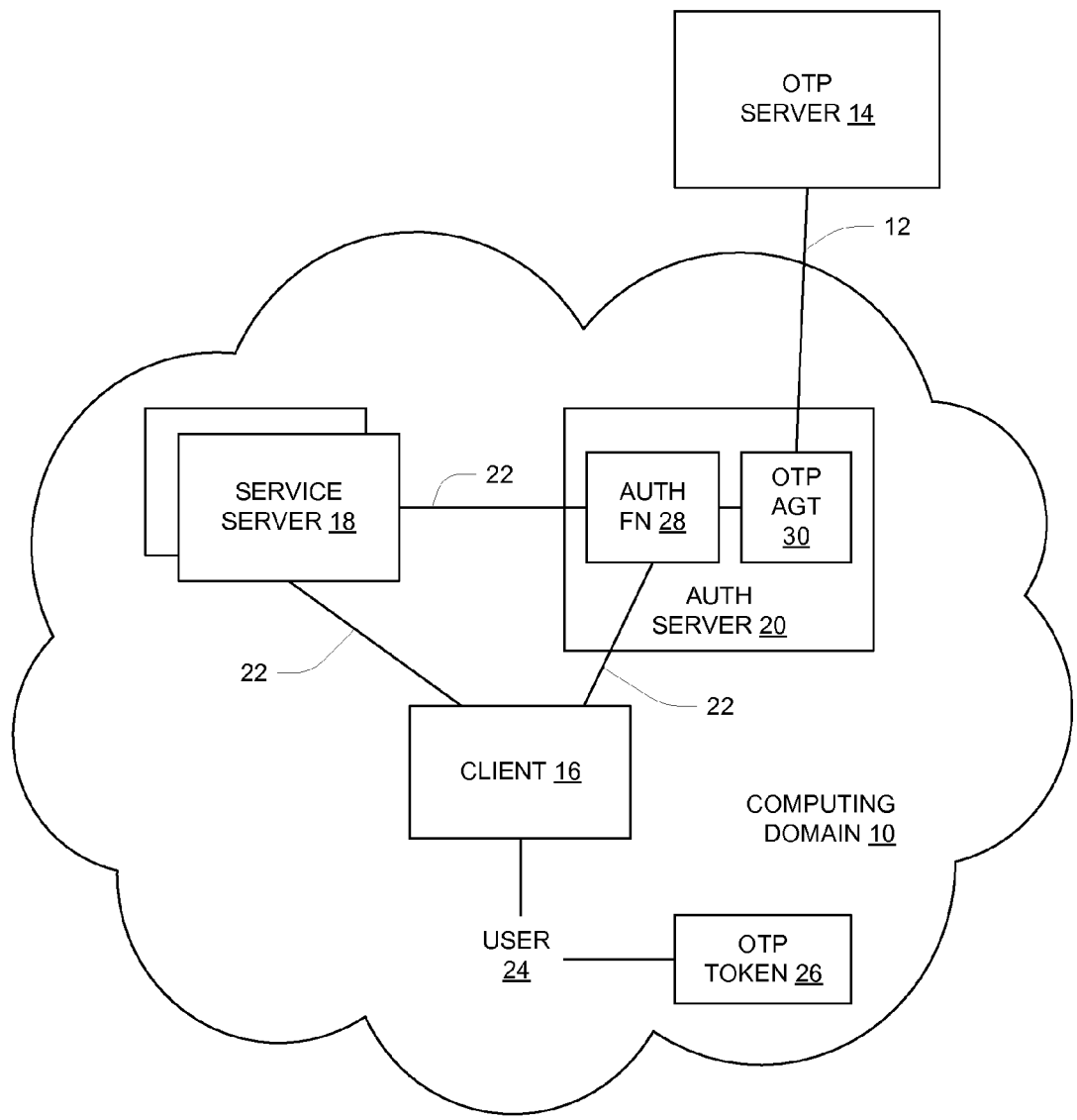
FIG. 1 is a block diagram of a computing system having a local authentication server coupled to a one-time password (OTP) server.

FIG. 1 shows a computing system in which a set of computers operate in a computing domain 10 having a communications channel 12 to a one-time password (OTP) server 14. The computing domain 10 may be under a single administration (such as a corporate LAN, for example) or a collection of separate administrations that cooperate in certain respects, including support for a particular authentication scheme to restrict use of computing resources within the computing domain 10 to only authorized users/clients and services/servers. As described more fully herein, the computing domain 10 makes use of an OTP service provided by the OTP server 14 as part of the authentication scheme. In the illustrated embodiment, the OTP server 14 is shown as separate from the computing domain 10, but in alternative embodiments the computing domain 10 may include one or more servers providing the same or similar OTP functions.

In the simplified depiction of FIG. 1, the computing domain 10 includes a client computer or "client" 16, one or more service servers 18, and one or more authentication servers 20, connected together by a computing domain network which is represented in FIG. 1 by network communications channels 22. The client 16 includes an interface to a user 24 who possesses and utilizes an electronic device referred to as a "token" shown as OTP token 26.

It will be appreciated that the client 16, service servers 18 and authentication server(s) 20 are computerized devices each of which may be realized as an organization of memory, processor(s), interface and interconnection circuitry along with software instructions executed by the processor(s) to perform functions as described herein. While in FIG. 1 these computers are shown as distinct devices, in alternative embodiments it may be desirable to merge some functions into a single device or alternatively to divide functions among multiple devices.

The authentication server 20 is shown as including an authentication function (AUTH FN) 28 and an OTP agent (OTP AGT) 30. The OTP agent 30 of the authentication server 20 works in conjunction with the OTP server 14 to provide OTP-related services to the authentication function 28, as more specifically described below. The authentication function 28 is logic (e.g., software executed by a processor of the authentication server 20) that provides a variety of authentication-related services of the particular authentication scheme used in the computing domain 10. One general type of authentication scheme is a so-called ticket-based scheme in which the client 16 interacts with the authentication server 20 to obtain "tickets" which vouch for the identity and authorized status of the client 16 and/or user 24 within the computing domain 10. The client 16 presents these tickets to the service servers 18 when requesting access to a service or other resource (for example, to a file system or database hosted by a service server 18), and the service servers 18 provide requested access to the client 16 on the basis of the tickets so presented (i.e., access is granted if the client 16 presents a ticket which meets all applicable requirements for acceptance by a service server 18). One widely used ticket-based authentication scheme is known by the name "Kerberos". A general description of the Kerberos scheme can be found in Neuman et al., "The Kerberos Network Authentication Service (V5)", RFC 4120 published July 2005 by The Internet Society. In the Kerberos scheme, the authentication function 28 is part or all of a "key distribution center" that performs a variety of services pertaining to the proper granting of tickets used for authentication purposes.

Although Kerberos is a complicated and sophisticated system with its tickets and extensive use of encrypted messages for security, the basic user authentication is via a conventional user identifier (such as an account name) and a relatively static password. The strength of Kerberos and similar systems can be enhanced by the use of physical devices such as tokens 26 and dynamic OTPs. The device 26 adds strength to the authentication by requiring that a user 24 both physically possesses the device 26 and have knowledge of a PIN or other secret information to operate the device 26. The dynamic OTPs provide strength both by their one-time use as well as their pseudo-randomness.

In one general OTP scheme, a device such as the token 26 applies a known combination function (such as an encryption algorithm) to a secret key value stored in the token 26 and a dynamic (time-based) value to generate dynamic authentication codes or OTPs. A separate verification computer shares the secret key value and has a time base that is synchronized with that of the device to an acceptable degree, and thus can also generate the same stream of OTPs as the device 26. In use, a user 24 obtains an OTP from the device as part of authenticating the user 24 in some operating environment, such as accessing an on-line service, performing a retail transaction, etc. The OTP from the user 24 is sent to the verification computer along with some identification of the user 24 and/or device. The verification computer uses the user/device identifier to select the secret key value for the device. The verification computer then performs the same combination function to generate an OTP, and compares the generated OTP with the OTP received from the user 24. A match indicates a successful authentication, and in a typical application the verification computer transmits a message back to the operating environment indicating whether the authentication was successful. This indication can be used to control whether some protected function is permitted, such as allowing access to a resource or completing a transaction. A description of one specific arrangement of this type of OTP authentication can be found in Brainard et al., "Method And Apparatus For Performing Enhanced Time-Based Authentication", U.S. Pat. No. 7,363,494 issued Apr. 22, 2008.

The system of FIG. 1 employs aspects of the above-described OTP system, in particular the use of a token 26 and a computer (OTP server 14) able to securely generate the same stream of OTPs to be used for authentication purposes. The system of FIG. 1 also incorporates other features that can provide advantageous benefits, in particular by leveraging the functionality of the authentication server 20 in the overall authentication scheme of the computing domain 10. In addition to its other attributes, the authentication server 20 is trusted by the OTP server 14, so that certain OTP-related functionality is off-loaded to the authentication server 20. Trust can be established in any of a variety of ways generally known in the art. For example, it may be established in advance of any OTP-related exchanges, either by direct administrative action and/or by employing more automated mechanisms such as SSL-based authentication. Alternatively, trust may be established as part of an initial or periodically performed OTP transaction, or even for each individual OTP transaction if deemed necessary. As an example of establishing trust during an initial OTP transaction, the OTP server 14 may enforce a requirement that the very first OTP transaction from a given authentication server 20 be performed by a system administrator or other responsible entity in the computing domain 10. The remaining description herein assumes the existence of trust between the authentication server 20 and the OTP server 14.

Beyond the trust relationship between the authentication server 20 and OTP server 14, it is assumed that at least the token 26 is known to the OTP server 14 and somehow registered for use by the user 24 for authentication purposes in the computing domain 10. In one general approach, the user 24 may be explicitly known to the OTP server 14 just as he/she is to the authentication server 20, and the OTP server 14 also maintains information associating the user 24 with one or more tokens 26 that may be used by the user 24. In another type of approach, the OTP server 14 may not have any personal identifying information of the user 24, but only an association between an impersonal user identifier and one or more tokens 26 that are associated with the user identifier. As an example of the latter approach, there may be some form of registration process that creates the user identifier and its association with a token(s) 26, but the association of the user identifier with an actual user 24 and any personal identifying information may be maintained only in the computing domain 10 and not available to the OTP server 14. In the description herein, the term "user identifier" describes a data item that is used by the OTP server 14 to perform a user-specific OTP process as described below, whether or not the user 24 is actually known to the OTP server 14. In fact, in one embodiment the user identifier may actually employ an identifier (such as a serial number) of a token 26, which only implicitly identifies a user 24 who may or may not be known to the OTP server 14.

Figure 2:
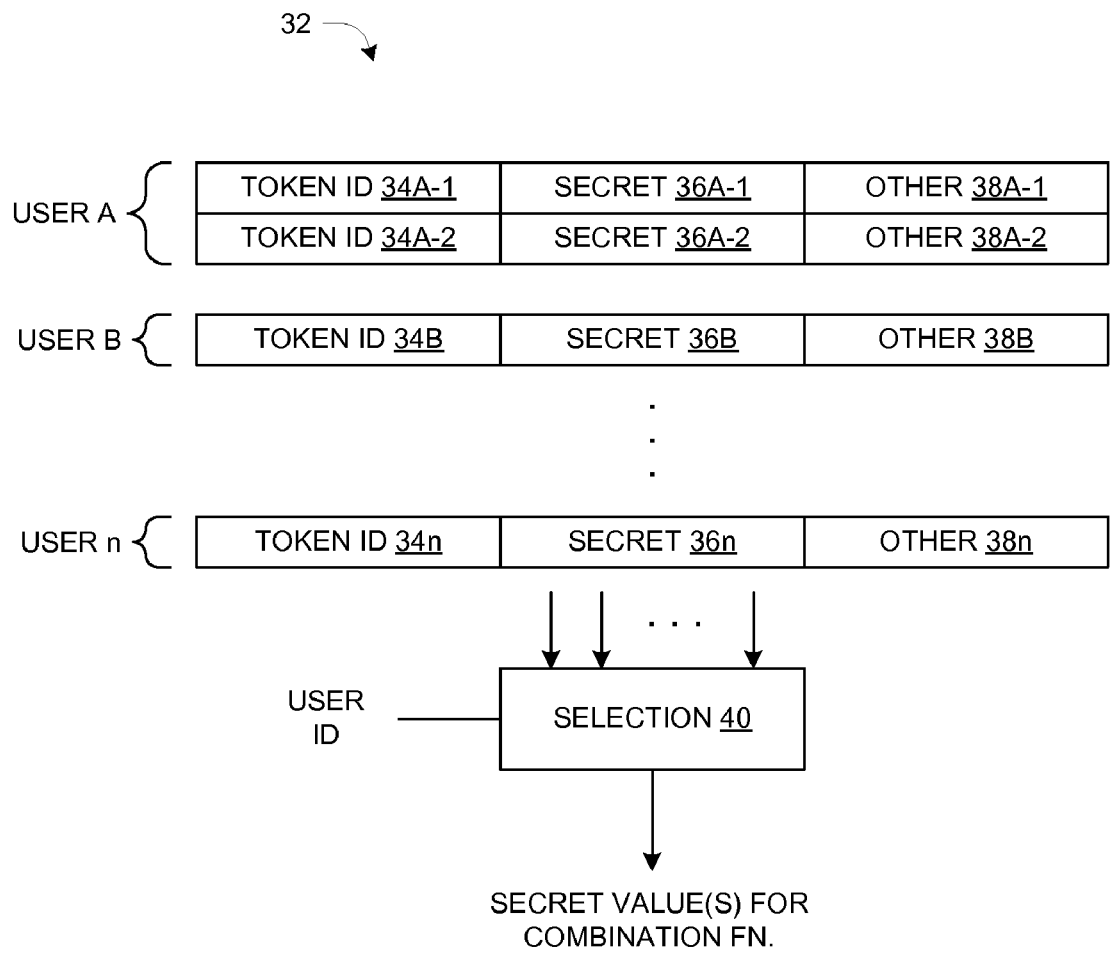
FIG. 2 is a schematic diagram of OTP-related information maintained at the OTP server.

FIG. 2 shows information 32 maintained and used by the OTP server 14. Part or all of the information 32 may be stored in a memory of the OTP server 14 during operation, and it will also be stored in a non-volatile store (such as a magnetic disk) due to its long-lived nature. In FIG. 2, users are identified by alphabetic identifiers A, B etc. and the reference numbers employ corresponding alphabetic indices indicating an association with the corresponding user. The information 32 includes a token identifier 34, a secret value 36, and other information 38 for each token 26 used by each user. In will be noted that in general a given user may use more than one token 26, as indicated by the two sets of information for User A (which correspond to two distinct tokens 26 identified by further indices −1, −2, etc.). Also shown in FIG. 2 is a selection function 40 used to select among the secret values 36 for use in performing the above-mentioned OTP combination function. The selection is based on a User ID obtained from an OTP request received by the OTP server 14, as more fully described below. The User ID in FIG. 2 represents the above-discussed "user identifier" in its broad sense. It may include a value, such as a user name, that directly identifies a user known to the OTP server 14. Alternatively, it may be a more randomly assigned value that just distinguishes one user from another for purposes of the OTP process. It may also be or include a token identifier. It should be noted that in the event that a user can use more than one token 26, then the selection function 40 may retrieve all such tokens 26 of the user for generating multiple candidate OTPs as described below.

Figures 3, 4A, 4B:
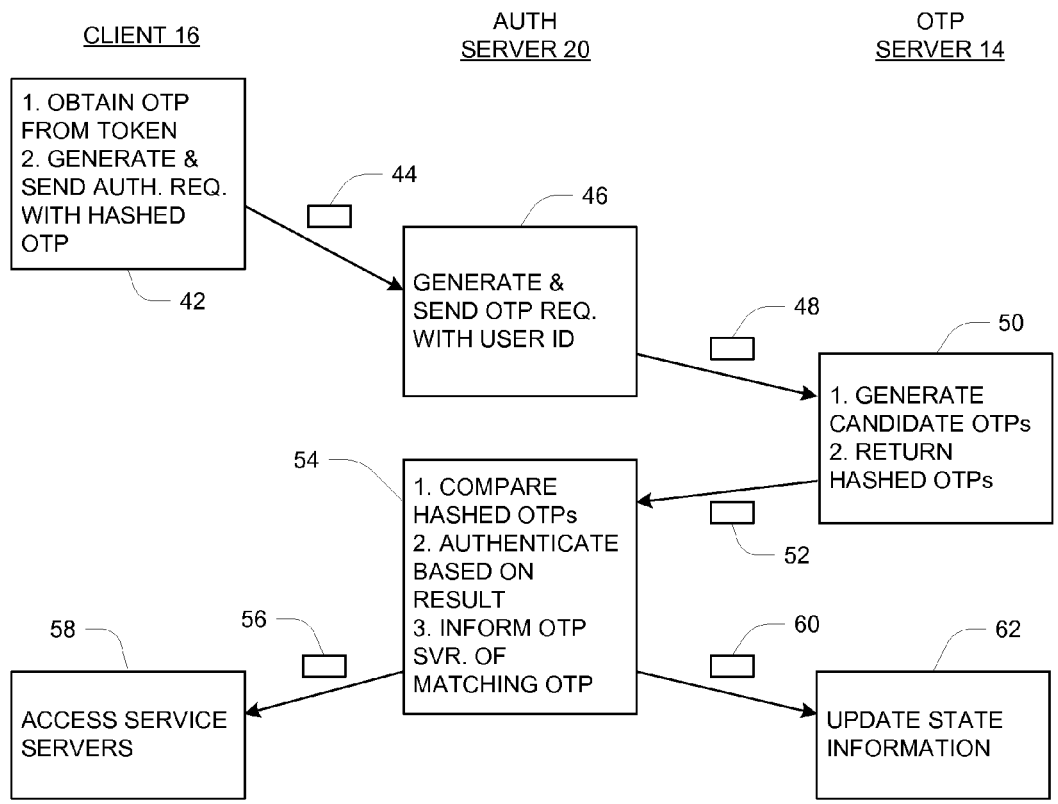
FIG. 3 is a flow diagram showing overall operation of the system of FIG. 1.
FIGS. 4A and 4B are schematic depictions of different organizations of hashed candidate OTP values in a response message from the OTP server.

FIG. 3 illustrates the overall operation of the system of FIG. 1. Actions of the client 16, authentication server 20 and OTP server 14 are shown in respective leftmost, center, and rightmost parts of the Figure, and time flows in the downward direction. Also shown in the form of arrows and accompanying small blocks is messaging that occurs between the different system components. It is assumed that the process is performed as part of a login or similar activity requiring use of a password in the computing domain 10. For example, in a Kerberos environment, a client 16 requests a so-called "ticket-granting ticket" (TGT) from the Kerberos server which is used for multiple subsequent session-specific authorizations between the client 16 and service servers 18. In such systems, both the user 24 and his/her static password are known to the Kerberos server and used for authentication in determining whether to grant the request. In the system of FIG. 1, it is assumed that the authentication being performed in the computing domain 10 requires successful use of an OTP.

At 42, the client 16 obtains a dynamically generated OTP from the token 26, for example as described above. A hash function is applied to this OTP to generate a hashed OTP value, and the hashed OTP value is included in an authentication request message 44 sent to the authentication server 20. The purpose of the hash function is to protect the OTP against relatively casual observation by any unauthorized entities (such as attackers) having access to either the communications or other facilities of the computing domain 10. As used herein, "hash function" is substantially any one-way function capable of masking the actual OTP value to unauthorized entities. Any of a variety of hash functions may be employed, including SHA and MD5 for example.

In some arrangements, there may be the possibility of any of multiple known hash functions to be used, along with a mechanism for identifying which specific one is to be used. For example, the mechanism may be a setting configured by a system administrator, or it may be a negotiation among the computing devices (e.g., between client 16 and authentication server 20). Once the configuration or negotiation is complete, the use of a particular hash function may be implicit in subsequent authentication operations. In alternative embodiments, there may be transaction-specific selection of a particular hash function. In this case, the hash function being used may be explicitly signaled, such as by use of a hash function identifier in the request message 34 and other messages as described below.

At 46, the authentication request message 44 is received by the authentication server 20, which retrieves the hashed OTP value from the request message 44 for use in a user authentication process performed by the authentication function 28 (FIG. 1). The exact nature of the authentication process is not germane here and it may be done in any of a variety of ways. The authentication process is presumed to be a necessary predecessor to allowing some protected or sensitive function to be performed within the computing domain 10, such as granting a TGT to a client 16 in a Kerberos environment. The authentication process requires verification of the OTP represented by the hashed OTP value from the request message 44.

To accomplish this verification of the OTP, the authentication server 20 first generates another request message referred to as an "OTP request" 48 and sends it to the OTP server 14. The OTP request 48 includes the User ID shown in FIG. 2 and discussed above, which is associated with the user 24 being authenticated. Additionally, in an embodiment in which explicit signaling of a hash function is employed, the authentication server 20 also includes in the OTP request 48 an identifier of the hash function used to generate the hashed OTP value received from the client.

At 50 the OTP server 14 uses the User ID to select one or more user-specific secret values and performs the combination function using the secret values and time-based dynamic values. For any given secret value and dynamic value, the process is the same as that performed by the token 26 as described above. In 50, however, the OTP server 14 is generating one or more candidate OTPs that may match the OTP from the user 24, not just one value that is expected to match the OTP from the user 24. Thus, the combination function is actually performed multiple times, one for each candidate OTP that is being generated.

There can be one or more criteria for finding candidate OTPs. As mentioned above, one possibility is that the user 24 may possess multiple tokens 26, and that case it may be desirable to generate one OTP for each token 26, which means performing the combination function for the secret value 36 of each token 26.

Time may be another criteria for candidate OTPs. It is possible that the time bases employed by a token 26 and the OTP server 14 may drift apart over time, such that there may be a mismatch of OTPs between the two solely because of differences in the dynamic values used in the combination function due to this drift. To address this possibility, it may be desirable to generate OTPs for time intervals that are adjacent to the current time interval as known by the OTP server 14, because a match for one of these OTPs could be interpreted as a valid match with an acceptable difference between the two time bases. More specifically, if the dynamic value covers a current time interval denoted $T_0$, the OTPs for the immediately preceding and succeeding intervals $T_{-1}$ and $T_{+1}$ may be candidate values. If even more time base difference is to be tolerated, this window could be widened further, for example to the range from $T_{-n}$ to $T_{+n}$ where n is some small integer greater than 1. Additionally, the width of the time window could be fixed or variable based on certain criteria. For example, the OTP server 14 may keep track of each use of the token 26, and if a long time as passed since the last use of the token 26, the time window may be widened on the expectation that more drift may have occurred.

Once the candidate OTPs have been generated, they are hashed according to the same hash function used by the client 16 to generate the hashed OTP value appearing in the authentication request 44, and then a response message 52 is returned to the authentication server 20 which includes these hashed candidate OTP values. It will be appreciated that this is a distinction from the scheme shown in the Brainard et al. patent, in which the verification server does not transmit candidate OTPs to a requestor but rather performs the entire authentication itself and simply notifies the requestor of the result. This exposing of OTPs (albeit in hashed form) is part of the reason for a trust relationship to exist between the OTP server 14 and the authentication server 20.

It is noted here that in different embodiments there may be reasons for one particular organization of the hashed candidate OTP values in the response message 52 over another, for example to promote processing efficiency at the authentication server 20 or other reasons. Two general types of organizations are specifically described below.

At 54 the authentication server receives the OTP response message 52 and retrieves the hashed candidate OTP values from it. It then performs a comparison between the hashed OTP value from the authentication request message 44 and one or more of the hashed candidate OTP values from the response message 52. In general, a comparison may need to be done against every hashed candidate OTP value, but it may be advantageous to stop comparing once a match has been found. Further processing will generally depend on the result of the comparing. The result may be treated in a binary fashion, i.e., the user 24 is deemed authenticated if and only if at least one hashed candidate OTP value matches the hashed OTP value from the request 44. The authentication function 28 of the authentication server 20 then takes appropriate action accordingly. For example, if the user 24 is deemed authenticated, then a response message 56 may be generated and sent to the client 16 which reflects the authentication, and at 58 the client 16 proceeds accordingly. Continuing with the Kerberos example, the response message 56 may convey a TGT as requested by the client 16, and at 58 the client 16 engages with the service servers 18 as discussed above. If the user 24 is not authenticated (i.e., no matching hashed candidate OTP values), then the response message 56 may be a denial of the request for a TGT or other similar action.

Alternatively, the processing based on the comparing of hashed OTP values in 54 may have a less binary nature. For example, if one matching hashed candidate OTP value is found but it corresponds to an outer extreme of the time window rather than the center, then it may be desirable to take further authentication action before treating the user 24 as authenticated. One general approach to such further authentication may be referred to as "next code" challenge functionality. The user 24 may be requested to repeat step 42 to generate another OTP which sequentially follows the first OTP according to the combination function and the values it uses, and a hash of this next OTP is compared with one or more hashed candidate OTP values. For such a second comparison, the hashed candidate OTP values may already be present at the authentication server 20 from the first response message 52, or it may be necessary to perform another round of a request message 48, step 50 (or an abbreviated version of it) and message 52 to obtain them. Another possibility is for the authentication server 20 to receive the additional hashed candidate OTP values in response to an informational message to the OTP server 14 as described below. In any event, the user 24 is only treated as authenticated if a match is also found for this next OTP. It will be appreciated that there are a variety of other scenarios and ways of handling them to accomplish a desired level of security in any particular application. Common among them, however, is the need for at least one successful comparison of a hashed candidate OTP value from the user 24 against a hashed candidate OTP value from the OTP server 14 before allowing a function protected by the authentication process (such as granting a TGT request in Kerberos) to be performed.

Also shown in FIG. 3 is the possibility that once the authentication process performed at the authentication server 20 at 54 is complete, the authentication server 20 may generate and send to the OTP server 14 an informational message 60 for use by the OTP server 14 in an updating step 62. The informational message 60 may identify which of the hashed candidate OTP values of the response message 52 was matched, if any, and if none matched then this information may be conveyed as well. This information may be useful to the OTP server 14 for a variety of purposes which may include taking some user-specific action. One such purpose is to adjust for differences between the time bases of the OTP server 14 and the token 26. If the matching hashed candidate OTP value is not the one for the current interval $T_0$ but rather the hashed OTP value for some other interval $T_x$, then the OTP server 14 may store an adjustment value in the other information 38 (FIG. 2) for this token 26 that corresponds to the value of "x". Then, in response to future OTP requests 48 involving this same token 26, the OTP server 14 can itself adjust the time-based value(s) used in the combination function according to this adjustment value. By this technique, the time-based hashed candidate OTP values that are returned to the authentication server 20 are more likely to be centered about the current time window of the token 26, so that there is less chance of either no match occurring or a match of a marginal hashed candidate OTP value solely to time base differences.

In addition to adjusting the time base, the OTP server 14 may also provide a next-code challenge function if the matching hashed candidate OTP value is for a time interval sufficiently distant from the OTP server's current time interval. For example, the OTP server 14 can re-generate a new set of hashed OTP values centered about the time interval for the matching hashed OTP value and return them to the authentication server 20 for use in the next-code challenge to the user, as described above.

Another potential use of the information in the informational message 60 is to identify occurrences of no matching at all, which may be helpful in identifying attacks that are characterized by repeated failed authentication attempts. The OTP server 14 can maintain a count of such occurrences over some time interval of interest, and further condition its response to future request messages 48 based on whether the count exceeds some predetermined threshold. This conditioning could go so far as setting an indicator that future OTP requests for this user 24 are to be denied. For this kind of use, the messaging between the OTP server 14 and the authentication server 20 may be used to provide a suitable response which influences a remaining part of the authentication of the user 24 at the authentication server 20. For example, it may indicate that the normal function of comparing hashed OTP values should not or cannot be performed, and that the authentication server 20 should take appropriate action (such as denying an authentication request). It will be appreciated that this outcome may also occur under other conditions, for example if the User ID from the request message 48 does not correspond to any entries in the information 32 (FIG. 2), i.e., the user 24 and/or token 26 represented by the User ID is not known to the OTP server 14.

FIGS. 4A and 4B provide examples of organizations of the hashed candidate OTP values in the response message 52. In FIG. 4A, the values are organized first by token and then by time interval. Thus, all hashed candidate OTP values for a first token 26-1 are arranged first, then those for a second token 26-2, etc. Within the group for each token 26-x, the hashed candidate OTP values may be arranged according to time interval such as T0, T+1, T−1, etc. as shown. This arrangement may be advantageous when users generally use only one token rather than multiple tokens. In FIG. 4B, the values are organized first by time interval and then by token. Thus, all hashed candidate OTP values for a first time interval T0 of all tokens 26 for this user 24 are arranged first, then those for a second time interval T+1, etc. Within the group for each time interval Tx, the hashed candidate OTP values may be arranged according to token, identified as TK1, TK2, TK3, etc. as shown. This arrangement may be advantageous when users generally use multiple tokens.

Figure 5:
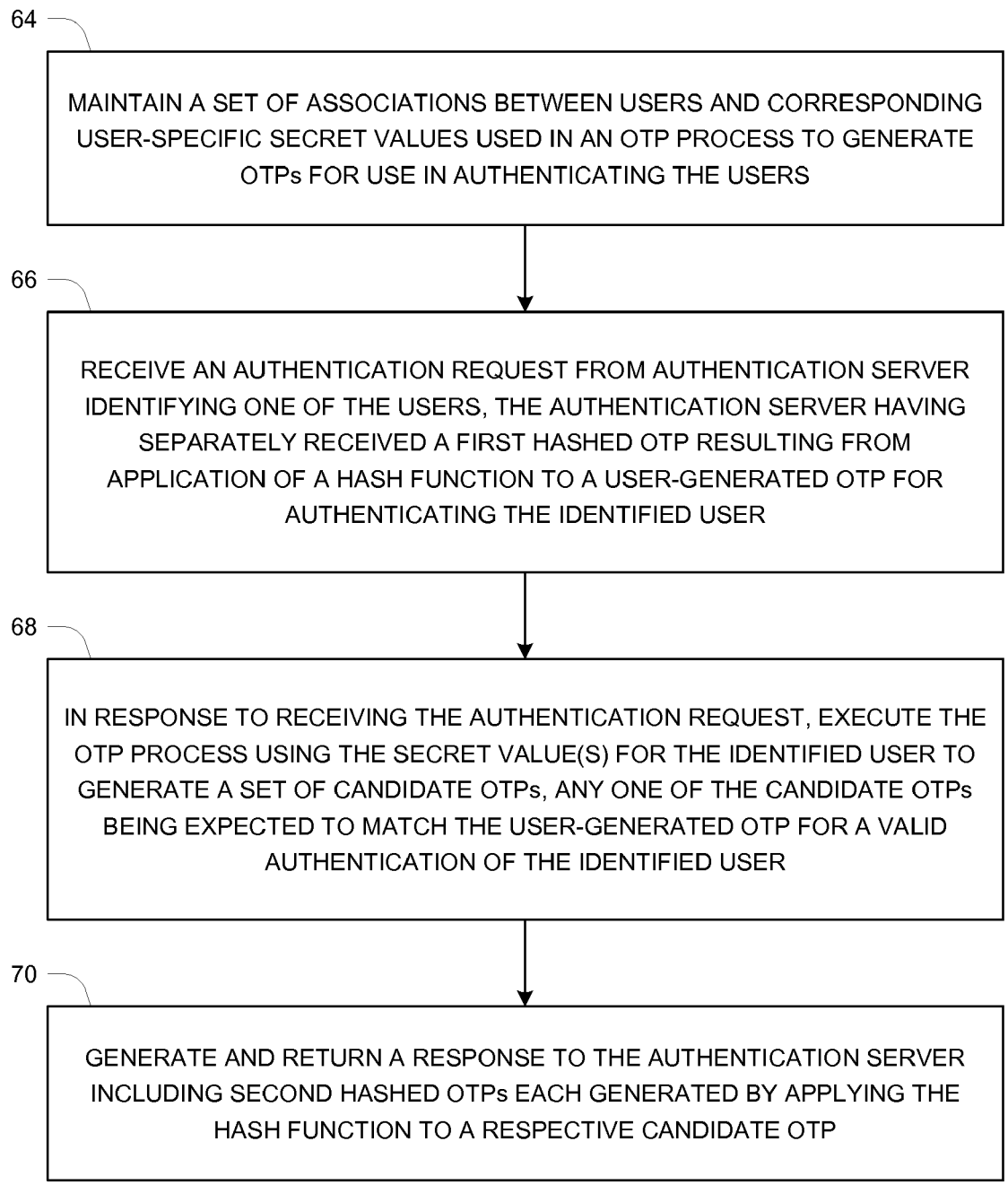
FIG. 5 is a flow diagram illustrating operation of the OTP server.
Figure 6:
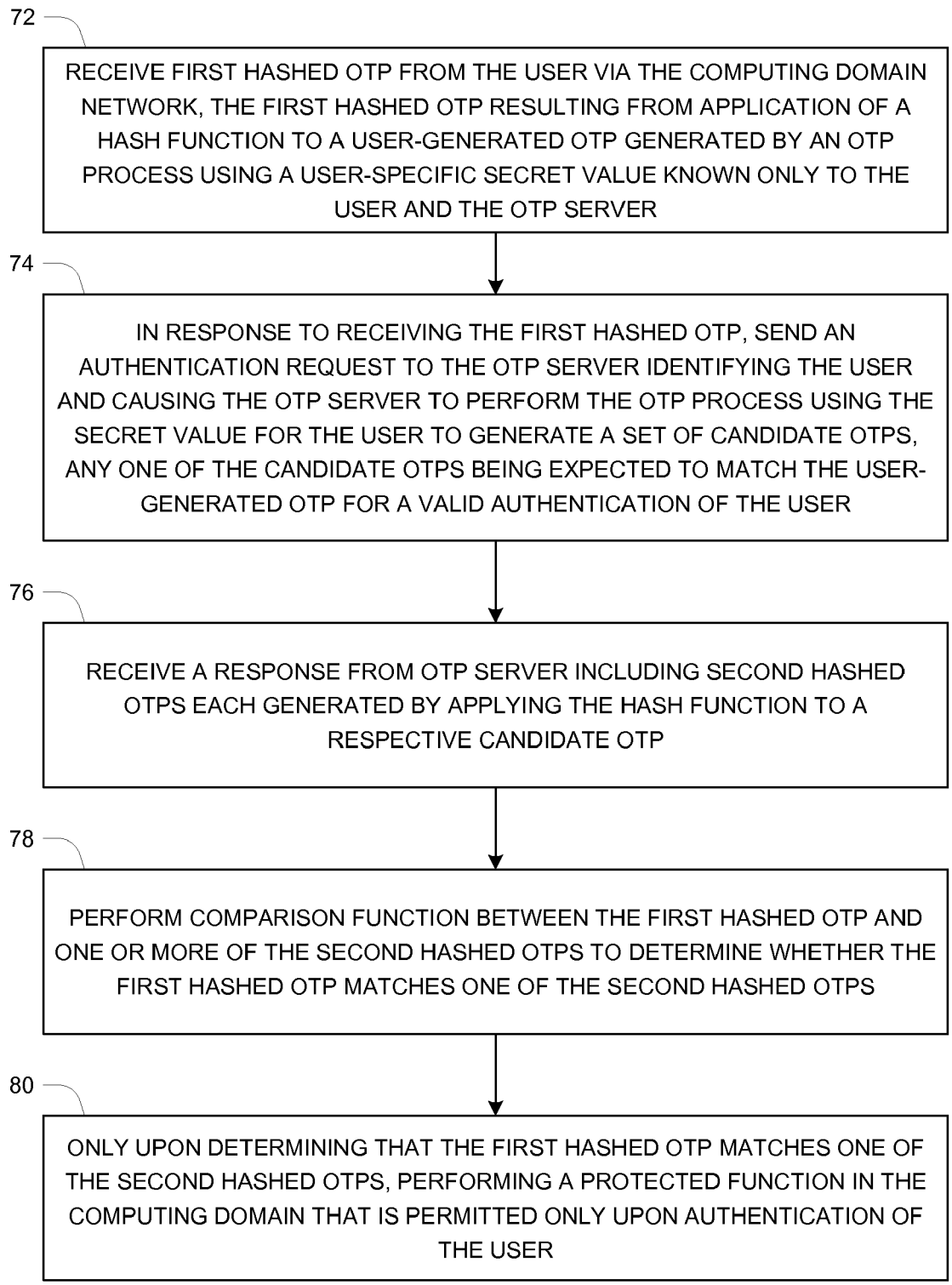
FIG. 6 is a flow diagram illustrating operation of the authentication server.

FIGS. 5-6 describe the processing at the OTP server 14 and authentication server 20 respectively in more particular detail. Much of this description is duplicative of the above overall description in connection with FIG. 3, but is provided for greater specificity about the processing performed by each of these components in the system. In the description below, reference numbers are used in parentheses to indicate that the feature or function corresponds to the specific feature or function described above.

FIG. 5 shows the processing at the OTP server (14). At 64, the OTP server maintains a set of associations between a plurality of users and corresponding user-specific secret values (36) used in a one-time-password (OTP) process to generate OTPs for use in authenticating the users. These values may be maintained in a memory of the OTP server as described above.

At 66, the OTP server receives an authentication request (48) from an authentication server (20) via a communications channel (12). The authentication request identifies one of the users. The authentication server has separately received a first hashed OTP value resulting from application of a hash function to a user-generated OTP for authenticating the identified user (24).

At 68, in response to receiving the authentication request, an OTP process (e.g., combination function as described above) is executed using the secret data for the identified user to generate a set of candidate OTPs, wherein any one of the candidate OTPs is expected to match the user-generated OTP for a valid authentication of the identified user.

At 70, the OTP server generates and returns a response to the authentication server which includes second hashed OTP values, each generated by applying the hash function to a respective candidate OTP.

Although not shown in FIG. 5, it will be appreciated that the OTP server may also perform additional processing based on information provided back to the OTP server from the authentication server regarding which, if any, of the second hashed OTP values matched the first hashed OTP value from the user, for example as described above in connection with step 62 of FIG. 3.

FIG. 6 shows the processing at the authentication server (20). At 72, the authentication server receives a first hashed OTP value from the user via the computing domain network (10). The first hashed OTP value results from application of a hash function to a user-generated OTP which was generated by an OTP process using user-specific secret data (36) known only to the user and the OTP server.

At 74, in response to receiving the first hashed OTP value, the authentication server sends an authentication request (48) to an OTP server (14) via a communications channel (12). The authentication request identifies the user and causes the OTP server to perform the OTP process using the secret data for the user to generate a set of candidate OTPs, wherein any one of the candidate OTPs is expected to match the user-generated OTP for a valid authentication of the user.

At 76, the authentication server receives a response from OTP server via the communications channel, the response including second hashed OTP values each generated by applying the hash function to a respective candidate OTP.

At 78, the authentication server performs a comparison function between the first hashed OTP value and one or more of the second hashed OTP values to determine whether the first hashed OTP value matches one of the second hashed OTP values. Generally, the comparison function is one that tests for equality, such as by subtracting one value from the other and testing the result for zero, or alternatively by performing a bitwise exclusive-OR function and then testing the result for zero. Such techniques are known in the art.

At 80, only upon determining that the first hashed OTP value matches one of the second hashed OTP values, the authentication server performs a protected function in the computing domain that is permitted only upon authentication of the user. As an example in a Kerberos environment, the authentication server may grant a TGT to the user. More generally, the protected function is one that provides access to resources or services to only authorized users, as determined by successful authentication.

While various embodiments of the invention have been particularly shown and described, it will be understood by those skilled in the art that various changes in form and details may be made therein without departing from the spirit and scope of the invention as defined by the appended claims.

What is claimed is:

1. A method by which a one-time password (OTP) server provides a one-time password service to an authentication server coupled to the OTP server by a communications channel, the method comprising the steps, performed by a processor of the OTP server, of:

maintaining, in a memory of the OTP server, a set of associations between a plurality of users and corresponding user-specific secret data used in a one-time-password (OTP) process to generate OTPs for use in authenticating the users;

receiving an authentication request from the authentication server via the communications channel, the authentication request identifying one of the users, the authentication server having separately received a first hashed OTP value resulting from application of a hash function to a user-generated OTP for authenticating the identified user;

in response to receiving the authentication request, executing the OTP process using the secret data for the identified user to generate a set of candidate OTPs, any one of the candidate OTPs being expected to match the user-generated OTP for a valid authentication of the identified user;

generating and returning a response to the authentication server via the communications channel, the response including second hashed OTP values each generated by applying the hash function to a respective candidate OTP;

subsequent to returning the response to the authentication server, receiving an informational message from the authentication server (a) indicating whether any of the second hashed OTP values has matched the first hashed OTP value, and (b) identifying which one, if any, of the second hashed OTP values has matched the first hashed OTP value; and conditionally taking further user-specific action based on the indication in the informational message whether any of the second hashed OTP values has matched the first hashed OTP value, wherein the further user-specific action includes (a) maintaining a count of recent occurrences of OTP requests for the user for which the informational message from the authentication server indicates that none of the second hashed OTP values has matched a hashed OTP value for the user, and (b) taking a count-based action based on whether the count of recent occurrences is greater than a predetermined threshold.

2. A method according to claim 1, wherein:

the OTP process incorporates time-based dynamic values that are synchronized between the OTP server and a device used to generate the user-generated OTP to within a time window; and the OTP process is performed multiple times for a device-specific secret value of the secret data, each iteration of the OTP process utilizing a respective different one of a set of dynamic values for a plurality of time intervals in the time window and generating a corresponding one of the second hashed OTP values.

3. A method according to claim 2, wherein:

the informational message from the authentication server identifies one of the second hashed OTP values as having matched the first hashed OTP value; and the further user-specific action includes matching-based action based on which of the second hashed OTP values is identified in the informational message.

4. A method according to claim 3, wherein the matching-based action includes making a time adjustment to the dynamic values used in subsequent performance of the OTP process for the user based on the time interval corresponding to the identified second hashed OTP value.

5. A method according to claim 3, wherein the matching-based action includes:

in the case that the identified second hashed OTP value is for a marginal time interval at an outer extreme of the time window, then (a) re-executing the OTP process with a next-succeeding dynamic value to obtain a next OTP, (b) generating a hashed next OTP value by hashing the next OTP, and (c) returning the hashed next OTP value to the authentication server for use in a next-code challenge to be made to the user.

6. A method according to claim 1, wherein the count-based action includes setting an indicator that future OTP requests for the user are to be denied.

7. A method according to claim 1, wherein the set of associations include, for each of certain ones of the users, associations of secret data to a plurality of corresponding devices used by each such one of the users to generate user-generated OTPs, and wherein the OTP process is performed once for each of a plurality of device-specific secret values for corresponding devices of the identified user, each iteration of the OTP process generating a corresponding one of the second hashed OTP values.

8. A method according to claim 1, wherein (a) the hash function is one of a plurality of distinct hash functions usable to create the second hashed candidate values, (b) the OTP request identifies a particular one of the hash functions to be used to generate the second hashed OTP values, and (c) the OTP server is operative to select and use the particular one of the hash functions based on its identification in the OTP request.

9. A method according to claim 1, wherein the set of candidate OTPs is a set of first-code OTPs, and further comprising executing the OTP process using the secret data for the identified user to generate a set of next-code candidate OTPs, any one of the next-code candidate OTPs being expected to match a next succeeding user-generated OTP in a next-code challenge to the identified user; and the response to the authentication server includes third hashed OTP values each generated by applying the hash function to a respective next-code candidate OTP for use by the authentication server in the next-code challenge.

10. A computerized device operable as a one-time password (OTP) server, comprising:

non-transitory memory operative to store computer instructions; and a processor coupled to the memory operative to execute the computer instructions to cause the computerized device to perform a method by which the computerized device provides a one-time password service to an authentication server coupled to the OTP server by a communications channel, the method comprising:

maintaining, in the memory, a set of associations between a plurality of users and corresponding user-specific secret data used in a one-time-password (OTP) process to generate OTPs for use in authenticating the users;

receiving an authentication request from the authentication server via the communications channel, the authentication request identifying one of the users, the authentication server having separately received a first hashed OTP value resulting from application of a hash function to a user-generated OTP for authenticating the identified user;

in response to receiving the authentication request, executing the OTP process using the secret data for the identified user to generate a set of candidate OTPs, any one of the candidate OTPs being expected to match the user-generated OTP for a valid authentication of the identified user;

generating and returning a response to the authentication server via the communications channel, the response including second hashed OTP values each generated by applying the hash function to a respective candidate OTP;

subsequent to returning the response to the authentication server, receiving an informational message from the authentication server (a) indicating whether any of the second hashed OTP values has matched the first hashed OTP value, and (b) identifying which one, if any, of the second hashed OTP values has matched the first hashed OTP value; and conditionally taking further user-specific action based on the indication in the informational message whether any of the second hashed OTP values has matched the first hashed OTP value, wherein the user-specific action includes (a) maintaining a count of recent occurrences of OTP requests for the user for which the informational message from the authentication server indicates that none of the second hashed OTP values has matched a hashed OTP value for the user, and (b) taking count-based action based on whether the count of recent occurrences is greater than a predetermined threshold.

11. A computerized device according to claim 10, wherein:

the OTP process incorporates time-based dynamic values that are synchronized between the OTP server and a device used to generate the user-generated OTP to within a time window; and the OTP process is performed multiple times for a device-specific secret value of the secret data, each iteration of the OTP process utilizing a respective different one of a set of dynamic values for a plurality of time intervals in the time window and generating a corresponding one of the second hashed OTP values.

12. A computerized device according to claim 11, wherein:

the informational message from the authentication server identifies one of the second hashed OTP values as having matched the first hashed OTP value; and the further user-specific action includes matching-based action based on which of the second hashed OTP values is identified in the informational message.

13. A computerized device according to claim 12, wherein the matching-based action includes making a time adjustment to the dynamic values used in subsequent performance of the OTP process for the user based on the time interval corresponding to the identified second hashed OTP value.

14. A computerized device according to claim 12, wherein the matching-based action includes:

in the case that the identified second hashed OTP value is for a marginal time interval at an outer extreme of the time window, then (a) re-executing the OTP process with a next-succeeding dynamic value to obtain a next OTP, (b) generating a hashed next OTP value by hashing the next OTP, and (c) returning the hashed next OTP value to the authentication server for use in a next-code challenge to be made to the user.

15. A computerized device according to claim 10, wherein the count-based action includes setting an indicator that future OTP requests for the user are to be denied.

16. A computerized device according to claim 10, wherein the set of associations include, for each of certain ones of the users, associations of secret data to a plurality of corresponding devices used by each such one of the users to generate user-generated OTPs, and wherein the OTP process is performed once for each of a plurality of device-specific secret values for corresponding devices of the identified user, each iteration of the OTP process generating a corresponding one of the second hashed OTP values.

17. A computerized device according to claim 10, wherein (a) the hash function is one of a plurality of distinct hash functions usable to create the second hashed candidate values, (b) the OTP request identifies a particular one of the hash functions to be used to generate the second hashed OTP values, and (c) the OTP server is operative to select and use the particular one of the hash functions based on its identification in the OTP request.

18. A computerized device according to claim 10, wherein the set of candidate OTPs is a set of first-code OTPs, and further comprising executing the OTP process using the secret data for the identified user to generate a set of next-code candidate OTPs, any one of the next-code candidate OTPs being expected to match a next succeeding user-generated OTP in a next-code challenge to the identified user; and the response to the authentication server includes third hashed OTP values each generated by applying the hash function to a respective next-code candidate OTP for use by the authentication server in the next-code challenge.

* * * * *